United States Patent Office 3,122,415
Patented Feb. 25, 1964

3,122,415
METHOD FOR THE PRODUCTION OF
PHOSPHORIC ACID
James G. Gilchrist, Jr., Bartow, Fla., assignor to International Minerals & Chemical Corporation, a corporation of New York
No Drawing. Filed Oct. 10, 1960, Ser. No. 61,343
5 Claims. (Cl. 23—165)

This invention relates to a novel process for the production of wet process phosphoric acid of improved quality. More particularly, the invention embraces a procedure for the production of wet process phosphoric acid from which the "post-precipitation" of solids is minimized.

Wet process phosphoric acid is conventionally prepared by sulfuric acid acidulation of phosphate rock. The acidulation reaction mixture comprises a suspension of calcium sulfate and other solid impurities in the dilute phosphoric acid product. The calcium sulfate and other solid impurities are separated, and the dilute acid product concentrated. Reference is made to chapter 12 of the treatise entitled "Phosphoric Acid Phosphates and Phosphatic Fertilizers," 2d ed., 1952, for a detailed description of the conventional manufacture of wet process phosphoric acid.

Conventional wet process phosphoric acid manufacture is beset by a plurality of problems. Efficient separation of the calcium sulfate by-product from the crude acid is difficult as a consequence of the normally slow filtration rate of the mixture. Moreover, wet process phosphoric acid is conventionally obtained in relatively low concentration not exceeding about twenty-six to about thirty percent by weight phosphorus pentoxide, and hence is normally concentrated by evaporation of a portion of the water present. Concentration procedures most frequently employed encounter a serious problem of foam formation.

The utility of conventional wet-process phosphoric acid is seriously limited by the problem of "post-precipitation," i.e., the formation of voluminous precipitates subsequent to the calcium sulfate removal step. In conventional wet process phosphoric acids, such post-precipitates frequently constitute at least about 3% by weight of the acid.

Post precipitation of solids from wet process phosphoric acid occasions many difficulties of major importance. Conventional wet process acid, when shipped in tank cars post-precipitates solids to a degree such that removal of the acid from the car is exceedingly difficult. The utilization of certain types of concentrating apparatus is foreclosed by the solids which occasion post-precipitation. Moreover, such solids seriously restrict the fields in which wet-process acid may be utilized.

It is accordingly a primary object of this invention to provide a process for the production of wet process phosphoric acid which demonstrates substantially less post-precipitation of solids than conventional wet process acid.

It is more specifically an object of the invention to provide a method from the pre-acidulation treatment of phosphate rock whereby wet process phosphoric acid produced therefrom is characterized by substantially less post-precipitation of solids than conventional wet process phosphoric acid.

It is an additional object of the invention to provide a crude or untreated wet process phosphoric acid which demonstrates no more than about 0.25 percent by weight post-precipitation of solids after standing at about 25° C. for seven days.

It is a further object of the invention to provide a method effective for the production of crude wet process phosphoric acid which does not require treatment to minimize post-precipitation.

It is a particular object of the invention to provide a procedure which substantially eliminates post-precipitation from wet-process phosphoric acid.

In accordance with this invention phosphate rock is intimately mixed with activated carbon prior to acidulation for the production of wet process phosphoric acid in conventional manner.

The most effective relative proportions of rock and acid will vary somewhat with the rock and activated carbon utilized and may readily be determined by appropriate tests. In general, the utilization of at least about 0.2 percent by weight of activated carbon based on the weight of rock is preferred. Any amount of activated carbon in excess of 0.2 percent by weight can be utilized, although no significant improved result attends the utilization of more than about 3.0% by weight of carbon. An optimum range is from about 0.5% to about 2.0% by weight of activated carbon based on the weight of rock employed.

The invention contemplates activated carbons generically. The particular type of activated carbon constitutes no essential part of the invention. In general, the more activated carbons are preferred. Appropriate activated carbons include Nu Char CEEA produced by West Virginia Pulp and Paper Co. and Darco S-51 produced by Atlas Power Co. Activated carbon is well known and commercially available material which requires no detailed identification. It is essential, however, that the carbon be activated. Alkylation acid, for example, which contains unactivated carbon which does not achieve the objects of the invention.

The activated carbon in some way cooperates in the acidulation step to yield a wet process phosphoric acid product superior to that which results from the treatment of conventional crude phosphoric acid with activated carbon as described in U.S. Patents 1,597,984 and 1,981,145. As demonstrated by the ensuing example, phosphoric acid produced pursuant to the invention demonstrates substantially less post-precipitation than conventional wet process acid treated with activated carbon.

The invention generically contemplates all of the various phosphate rocks from which wet process phosphoric acid may be derived. Reference is made to the treatise by Waggaman, supra, for a disclosure of a representative group of phosphate rocks. Representative phosphate rocks include Florida pebble phosphate, Tennessee phosphates, phosphates from western United States, Senegales phosphates, Israeli phosphates, and the like. Florida phosphate is preferred. The rock is preferably comminuted to a mesh size of not greater than about 4, preferably from about 8 to 100, prior to utilization in the invention.

The particular technique adapted for the production of wet process phosphoric acid from a mixture of phosphate rock and activated carbon forms no part of this invention which is embracive of all such procedures. Representative procedures are described inter alia in the cited treatise by Waggaman.

The best made presently known for the practice of the invention is reflected by the following example:

EXAMPLE 1

A quantity comminuted Florida pebble phosphate was divided into nine aliquot portions, three of such aliquot portions of phosphate rock were intimately mixed with 0.5% by weight of activated carbon (Nu Char CEEA) based on the weight of rock.

All nine aliquot portions of rock were then acidulated for about 3½ hours with about eighty parts by weight of thirty-eight Baumé sulfuric acid per each one hundred parts of rock. The acidulation reaction mixtures were processed in conventional manner to produce crude wet process phosphoric acid containing about 26% by weight phosphorus pentoxide.

The crude acid product samples derived from activated carbon free rock were utilized as controls. The remaining three such samples were treated with the same relative proportion of the same activated carbon mixed with the phosphate rock from which the remaining three acid samples were derived.

All nine acid samples were then permitted to stand quiescent for seven days at an average room temperature of about 25° C., and the quantity of post-precipitated solids in each sample thereafter determined the results as reported in Table I.

*Table I*

| Weight Percent Post-Precip., Sample No. | Control | Activated Carbon Added to Crude Acid | Activated Carbon Added to Rock |
|---|---|---|---|
| 1 | 1.0 | 0.43 | 0.21 |
| 2 | 1.1 | 0.84 | 0.22 |
| 3 | 1.1 | 0.41 | 0.21 |

The foregoing example is representative of the practice of the invention. Analogous results are obtained as the proportion of activated carbon to rock is varied and with variance in the source of rock and carbon.

It is apparent from the example that a significant advance in minimizing the problem of post-precipitation in wet process phosphoric acid is accomplished by the invention. The example demonstrates that the improved result achieved by the invention is attributable to the formation of a mixture of phosphate rock and activated carbon prior to acidulation, since comparable results are not obtained by treatment of conventional crude wet process phosphoric acid with activated carbon.

I claim:
1. In the production of wet process phosphoric acid, by the sulfuric acid acidulation of phosphate rock, the improvement which comprises reducing the quantity of solids post-precipitated from such acid by mixing phosphate rock from which said acid is derived with activated carbon prior to acidulation.
2. The process of claim 1 in which at least about 0.2 percent by weight of activated carbon based on the weight of the rock is utilized.
3. The process of claim 1 in which from about 0.2 percent to about 3 percent by weight of activated carbon based on the weight of the rock is utilized.
4. The process of claim 1 in which from about 0.5 percent to about 3 percent by weight of activated carbon based on the weight of the rock is utilized.
5. A method for the production of wet process phosphoric acid containing at least about 26 percent by weight phosphorus pentoxide and which, on standing quiescent for seven days at a temperature of about 25° C. deposits not more than about 0.25 percent by weight of solids which comprises mixing the particulate phosphate rock from which said acid is derived with at least about 0.2 percent by weight of activated carbon prior to sulfuric acid acidulation.

References Cited in the file of this patent
UNITED STATES PATENTS

| 241,868 | Liebig | May 24, 1881 |
| 1,047,864 | Washburn | Dec. 17, 1912 |
| 1,981,145 | Keller | Nov. 20, 1934 |
| 2,684,295 | Eyster | July 20, 1954 |
| 2,710,247 | Knowles et al. | June 7, 1955 |
| 2,807,521 | Lambe et al. | Sept. 24, 1957 |